United States Patent Office 3,305,443
Patented Feb. 21, 1967

3,305,443
ANTICOCCIDIAL COMPOSITION AND METHOD OF USING SAME
Alan Hayes and John Frederick Ryley, Macclesfield, England, assignors to Imperial Chemical Industries Limited, London, England, a corporation of Great Britain
No Drawing. Filed Aug. 26, 1963, Ser. No. 304,642
Claims priority, application Great Britain, Sept. 6, 1962, 34,247/62
14 Claims. (Cl. 167—53.1)

This invention relates to new compositions of matter and more particularly it relates to veterinary compositions which are useful for the prevention of coccidiosis in poultry.

It is known that sulphaquinoxaline and 1-(2-n-propyl-4-amino-5-pyrimidylmethyl)-2-methyl pyridinium chloride hydrochloride, the latter hereinafter referred to as amprolium, possess anticoccidial properties, and these two drugs have been used separately in the past for the prophylactic control of coccidiosis in poultry. Neither of the said drugs provides completely satisfactory prophylactic control of coccidiosis in poultry. For example sulphaquinoxaline does not provide adequate prophylactic control of certain species of caecal coccidia and the toxicity of this drug results in a depression of the weight gain of the treated poultry, whereas amprolium, which provides adequate prophylactic control of caecal coccidia, does not provide completely satisfactory prophylactic control of certain species of intestinal coccidia.

We have now found and herein lies the basis of our invention, that when certain mixtures of sulphaquinoxaline and amprolium are formulated there are obtained highly effective anticoccidial mixtures which are particularly advantageous for the prophylactic control of coccidiosis in poultry in that significantly smaller doses than those normally recommended and used for each of the two separate drugs lead to excellent prophylactic control of coccidiosis and, in addition, good weight gains in the treated poultry. Thus sulphaquinoxaline and amprolium have been found to be unexpectedly synergistic, and mixtures of these two drugs are of value for the prophylactic control of coccidiosis in poultry.

Thus according to the invention we provide new veterinary compositions which consist of, or comprise, from 1 to 2 parts by weight of sulphaquinoxoline in admixture with from 1 to 2 parts by weight of a pyrimidine derivative of the formula:

$$[A]_bcX$$

wherein A stands for a cation of the formula:

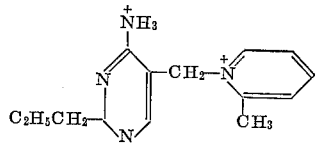

X stands for a pharmaceutically-acceptable anion, and $b$ and $c$ are positive integers such that the positive charge of $b$ molecules of the cation A is neutralised by the negative charge of $c$ molecules of the anion X.

As suitable pharmaceutically-acceptable anions there may be mentioned, for example, the chloride, bromide and sulphate anions.

The preferred pyrimidine derivative of the above formula is amprolium.

It is to be understood that the sulphaquinoxaline may be present in the veterinary compositions of the invention in the form of a salt thereof, for example in the form of an alkali metal or alkaline earth metal salt thereof such as the sodium, potassium or calcium salt.

Preferred compositions are those wherein there is present 1 part by weight of sulphaquinoxaline in admixture with 1 to 2 parts by weight of the said pyrimidine derivative and more particularly wherein there is present 1 part by weight of sulphaquinoxaline in admixture with 1 part by weight of the said pyrimidine derivative. A particularly valuable composition is that consisting of, or comprising, 1 part by weight of sulphaquinoxaline and 1 part by weight of amprolium.

It is to be understood that the two active ingredients of the new compositions of this invention may be admixed with a diluent or carrier in order to provide a food premix or a medicated foodstuff which may ultimately be used for the prophylactic control of coccidiosis in poultry. The said diluent or carrier may be for example kaolin, talc, calcium carbonate, fuller's earth, ground corn, corn meal, fish meal, corn distillers' dry grain, wheat shorts, corn cob meal, ground oyster shells or Attapulgus clay. These food premixes may be formulated so that the total active ingredient is present within the range of 5% to 95% by weight and the diluent or carrier present is correspondingly within the range of 5–95% by weight of the premix. It is intended that the said premixes should further be diluted with an animal foodstuff in order to provide a suitable medicated foodstuff which can be eaten directly by poultry.

The medicated foodstuff which is intended to be eaten directly by poultry for the prophylactic control of coccidiosis should preferably contain the sulphaquinoxaline within the range of 0.0025% to 0.008% by weight and the said pyrimidine derivative within the range of 0.0025% to 0.0085% by weight.

A particularly valuable medicated foodstuff composition intended to be eaten directly by poultry is one containing between 0.0025% and 0.008% by weight of sulphaquinoxaline and between 0.0025% and 0.0085% by weight of amprolium.

A preferred medicated foodstuff composition intended to be eaten directly by poultry is one containing 0.005% by weight of sulphaquinoxaline and 0.005% by weight of amprolium.

The veterinary compositions of the invention may optionally additionally contain one or more substances of veterinary utility, for example vitamins, minerals, or drugs of veterinary utility such as anticoccidial agents, anthelmintics or growth promoting substances.

The above food premixes can be used as the basis of conventional broiler rations, or the medicated foodstuff compositions can be used directly as broiler rations for feeding to poultry. It is found that such medicated broiler rations prevent mortality from coccidial infections, both caecal and intestinal types, and in addition, they provide much enhanced weight gains of infected birds.

The invention is illustrated but not limited by the following examples in which the parts are by weight:

Example 1

11.2 parts of sulphaquinoxaline, 7 parts of 1-(2-n-propyl-4-amino-5-pyrimidylmethyl) - 2 - methyl pyridinium chloride hydrochloride and 82.8 parts of whole ground corn are thoroughly mixed in a mixing and blending machine. There is thus obtained a food premix which can be mixed in suitable proportions with feeding rations and the medicated foodstuff so obtained can be fed to poultry for the prophylactic control of coccidiosis.

The above process is repeated except that the whole ground corn is replaced by corn distillers' dry grain, wheat shorts, corn cob meal, fuller's earth, calcium carbonate, Attapulgus clay or ground oyster shells. There is likewise obtained food premixes which can be added in suitable proportions to feeding rations thereby providing medicated foodstuffs which can be fed to poultry for the prophylactic control of coccidiosis.

Example 2

1 part of the food premix prepared as described in Example 1 is uniformly dispersed in 2240 parts of a commercial poultry starting mash. There is thus obtained a medicated foodstuff suitable for feeding to chickens for the prophylactic control of coccidiosis.

Example 3

Forty-eight nine-day-old chicks were each infected with 100,000 sporulated oocysts of E. tenella, and for the following seven days the infected chicks were fed on medicated foodstuff prepared as described in Example 2. Seven days following infection there was no mortality among the chicks and the average weight gain of each chick was 35.8 grammes. A similar group of infected chicks was fed for seven days following infection on the same unmedicated commercial poultry starting mash as that used as a starting material in Example 2. Seven days following infection the mortality was 93.8% and the average weight gain of each chick was 6.1 grammes. In a control group of non-infected chicks there was no mortality and there was an average weight gain of 35.0 grammes.

Example 4

The Table I below shows the percent mortality and the average weight gain (in grammes) of similar groups of infected poultry (chicks) which were fed on the same commercial starting poultry mash medicated with the various concentrations of sulphaquinoxaline, amprolium, or mixtures of sulphaquinoxaline and amprolium as indicated in the table. Each treatment used 6 groups of 8 chicks and the chicks were infected with 100,000 sporulated oocysts of E. tenella and treated with medicated food from the time of infection for 7 days. The mortality and the average weight gain of the chicks was recorded at the end of the period of 7 days immediately following the infection of the chicks for the said period of 7 days.

TABLE I

| Medication | Percent in food | Percent mortality | Average weight gain in grammes per chick |
|---|---|---|---|
| None (non-infected birds) | | 0.0 | 35.0 |
| None | | 93.8 | 6.1 |
| Sulphaquinoxaline | 0.005 | 39.6 | 23.0 |
| Amprolium | 0.0125 | 2.1 | 28.6 |
| | 0.025 | 2.1 | 31.8 |
| Amprolium plus Sulphaquinoxaline | 0.003125 0.005 | 0.0 | 35.8 |
| Amprolium plus Sulphaquinoxaline | 0.00625 0.005 | 0.0 | 37.4 |

It is clear from the results given above that the medicated foodstuffs containing both sulphaquinoxaline and amprolium are most effective for feeding to poultry for the prophylactic control of coccidiosis.

Example 5

11.2 parts of sulphaquinoxaline, 11.2 parts of amprolium and 77.6 parts of corn distillers' dry grain are thoroughly mixed. There is thus obtained a food premix which can be mixed in suitable proportions with feeding rations and the medicated foodstuff so obtained can be fed to poultry for the prophylactic control of coccidiosis.

Example 6

One part of the premix prepared as described in Example 5 is uniformly dispersed in 2239 parts of a commercial poultry mash. There is thus obtained a medicated foodstuff composition suitable for feeding to chickens for the prophylactic control of coccidiosis.

Example 7

636 nine-day-old chicks were each infected with 100,000 sporulated oocysts of E. tenella, and for the following 7 days the infected chicks were fed on medicated foodstuff prepared as described in Example 6. A group of 331 similar infected nine-day-old chicks was fed for 7 days immediately following infection on the same commercial poultry mash used as a starting material in Example 6 but to which 0.0125% by weight of sulphaquinoxaline had been added, and another group of 524 similar infected nine-day-old chicks was fed for 7 days immediately following infection on the same commercial poultry mash used as a starting material in Example 6 but to which 0.0125% by weight of amprolium had been added. The mortality and weight gain the three groups of chicks are shown in Table II and were recorded at the end of the period of 7 days immediately following the infection of the chicks for the said period of 7 days.

TABLE II

| Medication | Percent in food | No. of birds | Percent Mortality | Average weight gain in grammes per chick |
|---|---|---|---|---|
| Sulphaquinoxaline | 0.0125 | 331 | 35.4 | 24.7 |
| Amprolium | 0.0125 | 524 | 7.2 | 23.0 |
| Amprolium plus Sulphaquinoxaline | 0.005 0.005 | 636 | 1.4 | 35.9 |

The results of Example 7 show that the use of a mixture of sulphaquinoxaline and amprolium resulted in lower mortality and higher weight gains of the infected chickens than the use of either sulphaquinoxaline or amprolium separately, even though the dosage level of sulphaquinoxaline and amprolium used separately was 2.5 times greater than the dosage levels used in the said mixture.

What we claim is:

1. An anticoccidial veterinary composition which comprises from 1 to 2 parts by weight of sulphaquinoxaline in admixture with from 1 to 2 parts by weight of a pyrimidine derivative of the formula:

$$[A]_b cX$$

wherein A stands for a cation of the formula:

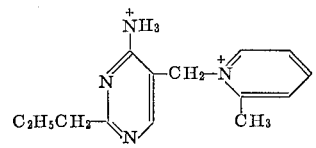

X stands for a pharmaceutically-acceptable anion, and $b$ and $c$ are positive integers such that the positive charge of $b$ molecules of the cation A is neutralised by the negative charge of $c$ molecules of the anion X.

2. A composition, as claimed in claim 1 wherein the pharmaceutically-acceptable anion is selected from the group consisting of the bromide and sulphate anions.

3. A composition, as claimed in claim 1, wherein the pyrimidine derivative is amprolium.

4. A composition, as claimed in claim 1, wherein the sulphaquinoxaline is present in the form of a salt selected from the group consisting of alkali metal and alkaline earth metal salts.

5. A composition as claimed in claim 1, wherein there is present 1 part by weight of sulphaquinoxaline in admixture with 1 to 2 parts by weight of the pyrimidine derivative.

6. A composition as claimed in claim 1, wherein there is present 1 part by weight of sulphaquinoxaline in admixture with 1 part by weight of the pyrimidine derivative.

7. A composition as claimed in claim 1, wherein there is present a carrier.

8. A composition, as claimed in claim 7, wherein the carrier is selected from the group consisting of kaolin, talc, calcium carbonate, fuller's earth, ground corn, corn meal, fish meal, corn distillers' dry grain, wheat shorts, corn cob meal, ground oyster shells and Attapulgus clay.

9. A composition as claimed in claim 7 which is a premix, wherein the carrier is present within the range of 5-95% by weight.

10. A composition as claimed in claim 7 in the form of a medicated foodstuff which contains sulphaquinoxaline within the range of 0.0025% to 0.008% by weight and the pyrimidine derivative, within the range of 0.0025% to 0.0085% by weight.

11. A composition as claimed in claim 10, which contains between 0.0025% and 0.008% by weight of sulphaquinoxaline and between 0.0025% and 0.0085% by weight of amprolium.

12. A composition as claimed in claim 11, which contains 0.005% by weight of sulphaquinoxaline and 0.005% by weight of amprolium.

13. A composition as claimed in claim 1 including a member of the group consisting of vitamins, minerals, anticoccidial agents, anthelmintics and growth promoting substances.

14. A process for the prophylactic control of coccidiosis in poultry which comprises administering to the said poultry a veterinary composition which comprises from 1 to 2 parts by weight of sulphaquinoxaline in admixture with from 1 to 2 parts by weight of a pyrimidine derivative of the formula:

$$[A]_b cX$$

wherein A stands for a cation of the formula:

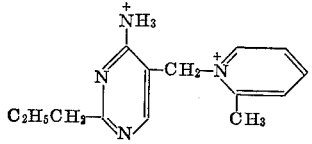

X stands for a pharmaceutically-acceptable anion, and $b$ and $c$ are positive integers such that the positive charge of $b$ molecules of the cation A is neutralised by the negative charge of $c$ molecules of the anion X.

References Cited by the Examiner

UNITED STATES PATENTS

| | | | |
|---|---|---|---|
| 2,823,160 | 2/1958 | Lux | 167—53.1 |
| 2,895,874 | 7/1959 | Lux | 167—53.1 |
| 3,001,909 | 9/1961 | Sarett | 167—53.1 |
| 3,020,277 | 2/1962 | Rogers | 167—53.1 |

OTHER REFERENCES

Merck Review, vol. 22, No. 2, 1961, pages 14 and 15.

SAM ROSEN, *Primary Examiner.*